United States Patent
Lissack et al.

(10) Patent No.: US 10,497,029 B2
(45) Date of Patent: Dec. 3, 2019

(54) SYSTEMS AND METHODS FOR FACILITATING BRAND INTEGRATION WITHIN ONLINE CONTENT AND PROMOTING THAT ONLINE CONTENT

(71) Applicant: Disney Enterprises, Inc., Burbank, CA (US)

(72) Inventors: Ryan G. Lissack, Manhattan Beach, CA (US); Benjamin P. Collier, Los Angeles, CA (US); David E. Smith, Los Angeles, CA (US); Philip Hansen, Santa Monica, CA (US); Kristopher D. Johns, Los Angeles, CA (US); Narbeh Dereghishian, Westwood, CA (US); Jonathan Bergknoff, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 456 days.

(21) Appl. No.: 14/520,271

(22) Filed: Oct. 21, 2014

(65) Prior Publication Data
US 2015/0112806 A1    Apr. 23, 2015

Related U.S. Application Data

(60) Provisional application No. 61/947,945, filed on Mar. 4, 2014, provisional application No. 61/897,179, filed on Oct. 29, 2013, provisional application No. 61/893,393, filed on Oct. 21, 2013.

(51) Int. Cl.
*G06Q 30/00* (2012.01)
*G06Q 30/02* (2012.01)
*G06F 16/242* (2019.01)
*G06F 3/0484* (2013.01)

(52) U.S. Cl.
CPC ..... *G06Q 30/0273* (2013.01); *G06F 3/04842* (2013.01); *G06F 16/2425* (2019.01); *G06Q 30/0242* (2013.01); *G06Q 30/0256* (2013.01); *G06Q 30/0276* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2004/0230481 A1 | 11/2004 | Bushold | |
| 2008/0033776 A1* | 2/2008 | Marchese | G06Q 20/10 705/7.33 |

(Continued)

*Primary Examiner* — Meredith A Long
(74) *Attorney, Agent, or Firm* — Esplin & Associates, PC

(57) ABSTRACT

Brand integration within online content and promoting that online content may be facilitated. A user may define search queries specifying parameter values of one or more parameters. In response to the user defined search queries, the system may identify sets of content producers having parameter values that satisfy the user defined search queries. The user may specify tasks for the identified sets of content producers. A first task may be related to creating online content and/or integrating an advertisement into online content. A second task may be related to promoting and/or endorsing the online content from the first task. The system may effectuate presentation of the user specified tasks to sets of content producers.

18 Claims, 4 Drawing Sheets

(56) References Cited

U.S. PATENT DOCUMENTS

| | | | |
|---|---|---|---|
| 2008/0065508 A1* | 3/2008 | Watt | G06F 17/30864 |
| | | | 705/26.1 |
| 2008/0275763 A1* | 11/2008 | Tran | G06Q 20/10 |
| | | | 705/35 |
| 2008/0307454 A1* | 12/2008 | Ahanger | G06Q 30/02 |
| | | | 725/36 |
| 2009/0132507 A1* | 5/2009 | Kadambi | G06Q 30/02 |
| 2009/0157450 A1* | 6/2009 | Athsani | G06Q 30/02 |
| | | | 705/35 |
| 2009/0177588 A1* | 7/2009 | Marchese | G06Q 30/02 |
| | | | 705/80 |
| 2009/0216630 A1* | 8/2009 | Carnahan | G06Q 30/02 |
| | | | 705/14.69 |
| 2010/0228603 A1 | 9/2010 | Bolder | |
| 2011/0178837 A1 | 7/2011 | Goerges | |
| 2012/0226602 A1 | 9/2012 | Narcisse | |
| 2013/0085828 A1 | 4/2013 | Schuster | |
| 2013/0343726 A1 | 12/2013 | Shackleton | |
| 2014/0071045 A1 | 3/2014 | Muchnick | |
| 2014/0089322 A1 | 3/2014 | Garcia | |
| 2014/0173644 A1 | 6/2014 | Ball | |
| 2015/0112793 A1 | 4/2015 | Collier | |
| 2015/0112816 A1 | 4/2015 | Collier | |
| 2015/0350259 A1 | 12/2015 | Garg | |
| 2016/0148278 A1 | 5/2016 | Marth | |
| 2016/0189198 A1 | 6/2016 | McKenzie | |
| 2017/0140060 A1 | 5/2017 | Cody | |

\* cited by examiner

SYSTEMS AND METHODS FOR FACILITATING BRAND INTEGRATION WITHIN ONLINE CONTENT AND PROMOTING THAT ONLINE CONTENT

CROSS REFERENCE TO RELATED APPLICATIONS

This application incorporates by reference each of the following provisional applications in their entirety: U.S. Provisional Application No. 61/893,393, filed Oct. 21, 2013, and entitled "Systems and Methods for Managing Online Multimedia Content"; U.S. Provisional Application No. 61/897,179, filed Oct. 29, 2013, and entitled "Systems and Methods for Managing Online Multimedia Content"; and U.S. Provisional Application No. 61/947,945, filed Mar. 4, 2014, and entitled "Systems and Methods for Developing Talent and Creating and Managing Online Programming".

FIELD

The disclosure relates to systems and methods for facilitating brand integration within online content and promoting that online content.

BACKGROUND

Internet advertising based on a user's previous searches is known. Typically, ads or banners may be placed next to search results or web page content. Those ads or banners may be generated automatically based on what may interest the viewer as gleaned by previous searches. Promoting content such as by purchasing social medial likes and/or followers is known. Typically, purchased followers and/or likes are generated by fake accounts.

SUMMARY

One aspect of the disclosure relates to a system configured for facilitating brand integration within online content and promoting that online content. The system may enable tiered branded integration and/or marketing within producer provided online content. Online content may include one or more of and/or a portion of an online video content, a social media content, an online content channel or feed, and/or other online content.

In exemplary implementations, a user may define search queries specifying parameter values of one or more parameters. In response to the user defined search queries, the system may identify sets of content producers having parameter values that satisfy the user defined search queries. For example, a first set of content producers having parameter values that satisfy a first user defined query and a second set of content producers having parameter values that satisfy a second user defined query, may be identified.

The user may specify tasks for the identified sets of producers. A first user specified task may be related to brand integration within a first online content. Brand integration within a first online content may include augmentation of a first online content and/or creation of a first online content. A second user specified task may be related to promoting the first online content resulting from the first user specified task. The user specified tasks may be packaged for providing social amplification of branded integration. A package may include the first user specified task and the second user specified task.

The system may effectuate presentation of the user specified tasks (e.g., individual tasks and/or packages of tasks) to producers that provide online content. Providing online content may include generating, authoring, contributing, administering, arranging, dispensing, producing, originating, publishing, and/or otherwise providing online content. The first set of content producers may be presented with the first user specified task. The second set of content producers may be presented with the second user specified task.

The performance of an individual one of the user specified tasks by an individual one of the producers may be evaluated to determine an outcome. The outcome may include a quantity of desired result and/or action. The system may distribute compensation based on the outcome to the individual one of the one or more producers that performed the user specified task.

In some implementations, the system may include one or more servers. The server(s) may be configured to communicate with one or more client computing platforms according to a client/server architecture. The users may access the system via client computing platform(s). The server(s) may be configured to execute computer readable instructions. The computer readable instructions may include one or more of a producer account component, a query component, a producer identification component, a task component, a content provisioning component, a control component, and/or other components.

A producer account component may be configured to access and/or manage one or more producer profiles and/or producer information associated with producers of the system. The one or more producer profiles and/or producer information may include information stored by servers, electronic storage, external resources, client computing platforms, and/or other storage locations. The producer profiles and/or producer information may include, for example, online content provided by producers, information identifying producers (e.g., a username or handle, a number, an identifier, and/or other identifying information), security login information (e.g., a login code or password), virtual space account information, subscription information, a stored value representing currency information (e.g., related to compensation earned), online content information, online content subscriptions, demographic information associated with producers, user identified task performance history, performance evaluation information, information reflecting online content characteristics (e.g., parameter values, and/or other information), and/or other information related to producers.

The query component may be configured to receive user defined search queries specifying parameter values for one or more parameters. The queries may include a first user defined search query and a second user defined search query. The one or more parameters may describe one or more of producer content characteristics, producer characteristics, and/or other features related to production, distribution, consumption, and/or monetization of online content.

In some implementations, producer content characteristics may include characteristics describing online content at least partially provided, generated, produced, originated, published, or otherwise provided by individual content producers. Producer characteristics may include characteristics describing individual ones of the more than one content producers. In some implementations, producer content characteristics may include one or more of subject matter characteristics, audience characteristics, temporal characteristics, format characteristics, distribution characteristics, outcome characteristics, and/or characteristics of other aspects of the producer content. Producer characteristics may include one of more of task performance characteristics, connection characteristics, membership characteristics, demographic characteristics, location characteristics, and/or other producer characteristics.

The parameter values for one or more parameters may include a quantity, a term, a binary value, a selection from a dropdown menu, a selection from a radio button, a selection from a check box, and/or other parameter value representing the boundaries of the query for one or more parameters.

The producer identification component may be configured to identify sets of content producers having parameter values that satisfy the user defined search queries. A first set of content producers having parameter values that satisfy the first user defined search query may be identified. In some implementations, identification of the first set of content providers may be responsive to receipt of a first user defined search query specifying parameter values for a first set of one or more parameters. A second set of content producers having parameter values that satisfy the second user defined search query may be identified. In some implementations, the second set of content producers may be identified responsive to receipt of a second user defined search query specifying parameter values for a second set of one or more parameters.

The task component may be configured to receive user specified tasks for identified sets of producers. The user specified tasks may include a first user specified task and a second user specified task. The first user specified task may be related to branded integration within a first online content. Brand integration within a first online content may include augmentation of a first online content and/or creation of a first online content. A first online content may include one or more of and/or a portion of an online video content, a social media content, an online content channel or feed, and/or other online content.

For example, the first user specified task may include one or more of augmenting a first online content by integrating an advertisement into a portion of the first online content, creating a first online content and/or a portion of a first online content, and/or other user specified tasks. The second user specified task may be related to promotion of the first online content. For example, the second user specified task may include one or more of endorsing a portion of online content, promoting a portion of online content, and/or other user specified tasks.

The content provisioning component may be configured to effectuate presentation of the user specified tasks to the identified sets of producers. In some implementations the first set of content producers may be presented with the first user specified task. The second set of content producers may be presented with the second user specified task. For example, one or more offers (e.g., presenting the user specified tasks) to perform the user specified tasks may be presented to one or more sets of producers of online content identified by the user defined search queries.

In some implementations, the content provisioning component may be configured to facilitate acceptance of the user specified tasks by one or more of the individual ones of the sets of producers. Facilitation of acceptance may responsive to the presentation of the user specified tasks to producers. In some implementations, the content provisioning component may be configured to facilitate acceptance of the first user specified action by one or more of the first set of content producers identified. In some implementations, acceptance of the second user specified task by one or more of the individual ones of the second set of content producers identified may be facilitated. For example, acceptance may include acceptance of an offer (e.g., representing acceptance of the user specified task presented).

In some implementations, the content provisioning component may be configured to facilitate display of the first online content provided and/or related to the first user specified task. Provided based on the first user specified task may include at least partially provided, generated, produced, originated, published, or otherwise provided by one or more individuals ones of the first set of content producers performing the first available task. The display of the first online content may include publication of the online content. For example, the display or publication of the first online content may be via a social media platform.

In some implementations, the system may include a control component. The control component may be configured to evaluate performance of the first user specified task to determine a first outcome. The first outcome may correspond to the first user specified task performed by an individual one of the first set of content producers. The first outcome may be a quantity of a desired result and/or action. The control component may be configured to distribute compensation based on the first outcome. The compensation may include a stored value, wages, cash and/or check, awarded points, earned prizes, and/or other compensation including a representation of payment earned by the individual one of the first set of producers.

In some implementations, the control component may be configured to evaluate performance of the second user specified task to determine a second outcome. The second outcome may correspond to the second user specified task performed by an individual one of the second set of content producers. The second outcome may be a quantity of a desired result and/or action. The control component may be configured to distribute compensation based on the second outcome. The compensation may include a stored value, wages, cash and/or check, awarded points, earned prizes, and/or other compensation including a representation of payment earned by the individual one of the second set of producers.

In some implementations, the first and/or second outcomes may be a quantity of a desired result and/or action corresponding to the first and/or second user specified tasks. In some implementations, the desired result and/or action may include a content consumer action based on the online content provided based on the performed user specified task. A content consumer may include a user who views, contributes to, interacts with, and/or accesses digital media via the internet. A content consumer action may include, for example, a content consumer selecting and/or clicking on a portion of the online content, viewing a portion of the online content, promoting a portion of the online content, endorsing a portion of the online content, and/or other content consumer actions.

In some implementations, the desired result and/or action may include a producer action based on the first online content. For example, a desired result and/or action may include a producer sharing the first online content, viewing a portion of the first online content, promoting a portion of the online content, endorsing a portion of the online content, and/or other producer actions.

The control component may be configured to facilitate approval of the first user specified tasks by one or more individual ones of the first set of content producers. For example, approval may include confirmation that the first user specified task performed by an individual one of the one or more of the first set of producers represents the first user specified task presented to the first set of producers. Approval may include a user indicating the performed user specified task was performed according to specifications set forth by the user in the user specified task presented. The specifications set forth by the user may include criteria and/or requirements the user expects the performed user specified task to meet. In some implementations, approval may be required prior to display or publication of the first online content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
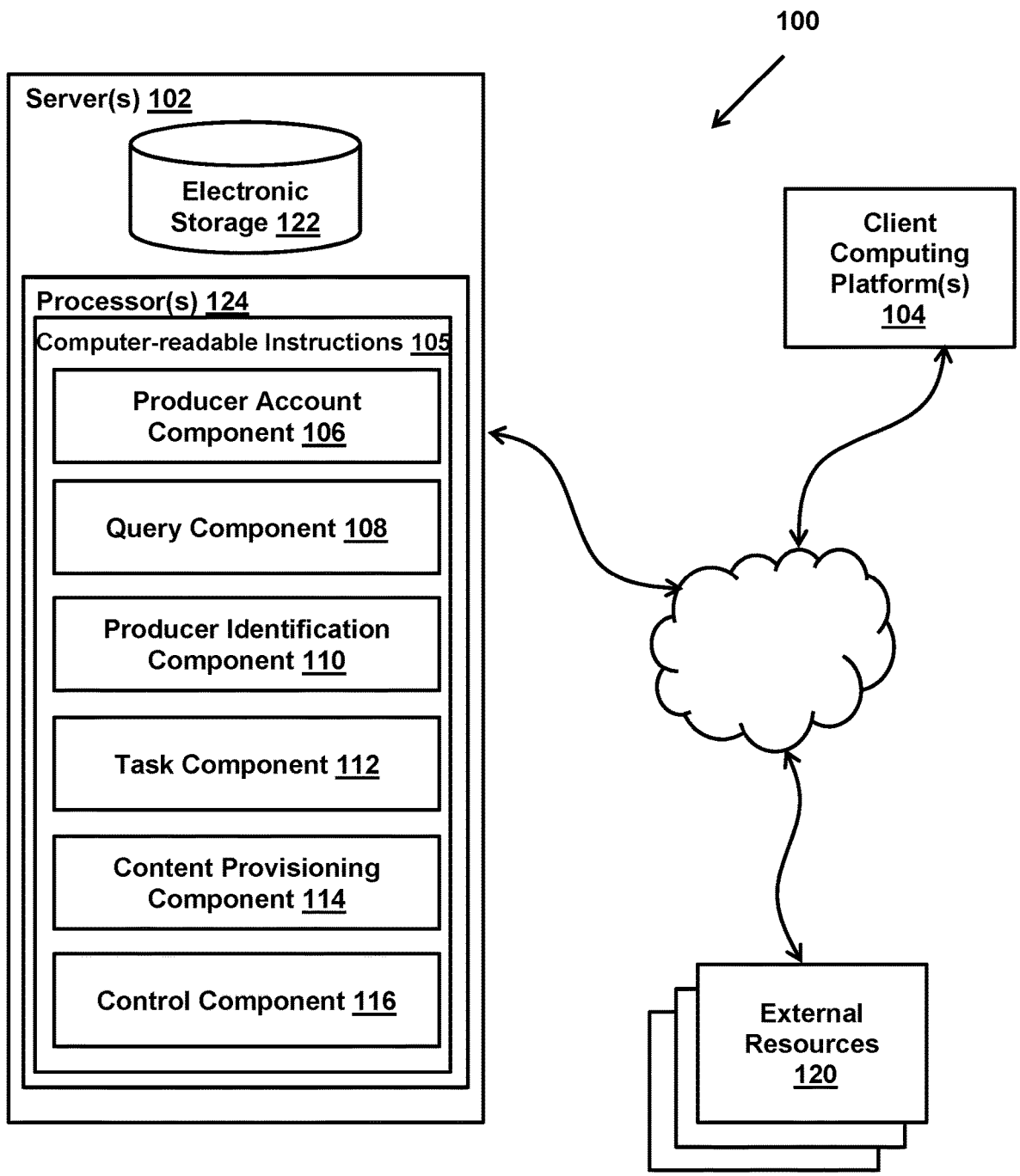
FIG. 1 illustrates a system configured for facilitating brand integration within online content and promoting that online content, in accordance with one or more implementations.

FIG. 1 illustrates a system 100 configured for facilitating brand integration within online content and promoting that online content, in accordance with one or more implementations. In exemplary implementations, a user may define search queries specifying parameter values of one or more parameters. In response to the user defined search queries, system 100 may identify sets of content producers having parameter values that satisfy the user defined search queries. For example, system 100 may determine a first set of content producers having parameter values that satisfy a first user defined query and a second set of content producers having parameter values that satisfy a second user defined query.

The user may specify tasks for the identified sets of producers. A first user specified task may be related to brand integration within a first online content. Brand integration within a first online content may include augmentation of a first online content and/or creation of a first online content. A second user specified task may be related to promoting the first online content resulting from the first user specified task. The user specified tasks may be packaged for providing social amplification of branded integration. A package may include the first user specified task and the second user specified task. The first user specified task may be presented to different content producers than the second user specified task. For example, the first user specified task may be presented to a first set of content producers perceived by the user to be more influential and/or have a larger audience (or a larger audience having some user specified characteristics) than some or all of the second set of content producers presented with the second user specified task. By incentivizing the first user specified task, and then incentivizing the second user specified task to draw further attention to the first user specified task, the "virality" of the content produced incorporating and/or satisfying the first user specified task may be enhanced. By incentivizing the first user specified task, and then incentivizing the second user specified task to draw a variety of attention to the first user specified task, new and/or different audiences may be exposed to new and/or different online content and/or online content producers. That is, the effectiveness and/or efficiency of marketing in this manner may be enhanced.

The user specified tasks (e.g., the package) may be presented to producers that provide online content. Providing online content may include generating, authoring, contributing, administering, arranging, dispensing, producing, originating, publishing, and/or otherwise providing online content. In some implementations, the first set of content producers may be presented with the first user specified task. The second set of content producers may be presented with the second user specified task. For example, producers may be presented with user specified tasks such that the presentation may include offers for the producers to perform the user specified tasks. The performance of an individual one of the user specified tasks by an individual one of the producers may be evaluated to determine an outcome. The outcome may include a quantity of a desired result and/or action. System 100 may be configured to distribute compensation to the individual one of the one or more producers that performed the user specified task, based on the outcome.

In some implementations, system 100 may include one or more servers 102. The server(s) 102 may be configured to communicate with one or more client computing platforms 104 according to a client/server architecture. The users may access system 100 via client computing platform(s) 104. The server(s) 102 may be configured to execute computer readable instructions 105. The computer readable instructions may include one or more of a producer account component 106, a query component 108, a producer identification component 110, a task component 112, a content provisioning component 114, a control component 116, and/or other components.

Producer account component 106 may be configured to access and/or manage one or more producer profiles and/or producer information associated with producers of system 100. The one or more producer profiles and/or producer information may include information stored by server(s) 102, electronic storage 122, external resources 120, client computing platforms 104, and/or other storage locations. The producer profiles and/or producer information may include, for example, online content provided by producers, information identifying producers (e.g., a username or handle, a number, an identifier, and/or other identifying information), security login information (e.g., a login code or password), virtual space account information, subscription information, a stored value representing currency information (e.g., related to compensation earned), online content information, online content subscriptions, online content information, online content subscriptions, demographic information corresponding to producers, user identified task performance history, performance evaluation information, information reflecting online content characteristics (e.g., parameter values, and/or other information), and/or other information related to producers.

Query component 108 may be configured to receive user defined search queries specifying parameter values for one or more parameters. The queries may include a first user defined search query and a second user defined search query. The one or more parameters may describe one or more of producer content characteristics, producer characteristics, and/or other features related to production, distribution, consumption, and/or monetization of online content.

Producer content characteristics may include characteristics describing online content at least partially provided, generated, produced, originated, published, or otherwise provided by individual content producers. Producer characteristics may include characteristics describing individual ones of the more than one content producers.

In some implementations, examples of producer content characteristics may include one or more of subject matter characteristics, audience characteristics, temporal characteristics, format characteristics, distribution characteristics, outcome characteristics, and/or characteristics of other aspects of the producer content.

Subject matter characteristics may describe the material within the online content. Examples of subject matter characteristics of online content may include a genre, topic, title, description, tags, commentary, amount of content, and/or other subject matter characteristics of the online content. For example, a subject matter characteristic for video content created by a producer may include traveling.

An audience characteristic may describe information or characteristics related to the audience of the online content. Examples of audience characteristics may include audience demographic information, subscriber demographic information, a subscriber count, an audience size, audience comment activity, audience viewing habits, audience responsiveness, audience spending characteristics, audience monetization, audience interests, proclivity to participate in social sharing, and/or other audience characteristics.

Audience demographic information may include one or more of information and/or statistics related to a content consumer population of the online content. The content consumer population may include the users who view, contribute to, interact with, and/or access the online content. Information and/or statistics related to a content consumer population may include one or more of age, gender, ethnicity, race, marital status, income level, audience education, audience occupation, geographic location, language, and/or other demographic information. For example, audience demographic information may include that 15% of the content consumer population that is female and ages 30-35. Subscriber demographic information may include statistics related to the content consumers who follow and/or subscribe to the online content provided by a given producer. For example, subscriber demographic information may include that 25% of subscribers have an annual income of $35,000-$45,000.

A subscriber count may include a quantity of content consumers who follow and/or subscribe to online content provided by a given content producer. An audience size may include a size and/or breadth of the content consumer population. Audience viewing habits may include information related to the habits of the content consumer population while viewing online content. For example, an audience viewing habit may include that 15% of content consumers view a given online content from a mobile device. Audience responsiveness may describe a content consumer population's likelihood and/or history of interacting with the online content. For example, audience responsiveness may include that 15% of the content consumer population of a given time period clicked an advertisement link integrated into online video content.

Audience spending characteristics may describe the spending tendencies of a given content consumer population. For example, an audience spending characteristic may include an amount of instances that viewing an advertisement led to the purchase of a product of the advertisement by one or more of the content consumer population. Audience interests may describe the interests of the content consumer population. Audience proclivity to participate in social sharing may describe the likelihood and/or activity level of actual and/or potential audience participation.

Temporal characteristics may describe a date and/or time aspects of online content. For example, a temporal characteristic may include one or more of a time the online content was last viewed and/or promoted, the length of the online content, periods at which online content (e.g., episodes) are released, content velocity (e.g., rate of content release/production), impressions of new content, impressions of library content, and/or other information relating to other time features of the online content.

Format characteristics may describe a content format, file format, and/or other format characteristics of the online content. The content format may include information related to the form of the online content. Examples of content format may include one or more of a video, a picture, a social media post, and/or other content formats. The file format may include information related to a structure of a file that may define the way it is stored and displayed on a screen. Examples of file formats may include one or more of .JPG, .PNG, .MOV, .MPEG4, .MP4, .AVI, .WMV, .MPEGPS, .FLV, .3GPP, and/or other file formats.

Distribution characteristics may describe the how online content is displayed or distributed. Distribution characteristics may include publication locations. Examples of distribution characteristics may include one or more of a system video channel, Facebook, YouTube, Twitter, Pinterest, LinkedIn, Google+, Flickr, Tumblr, Blogger, Vine, Instagram, Snapchat, Maker.TV, broadcast or cable television, and/or other publication locations.

Outcome characteristics may describe aspects of content consumer actions resulting from the online content. Examples of outcome characteristics include, for example, a view count, promotion count, comment count, an endorsement count, a sharing count, an up-vote count, and/or other outcome characteristics. A view count may include a number of times the online content is viewed by a content consumer. A promotion count may include a number of times the online content is advanced. A comment count may include a number of comments generated for the online content. An endorsement count may include a number of times the online content is supported. A sharing count may include a number of times the online content is shared. An up-vote count may include the number of times the content is upvoted and/or liked. For example, an outcome characteristic of an online video may include a view count of 100,000.

Examples of producer characteristics may include one of more of task performance characteristics, connection characteristics, membership characteristics, demographic characteristics, location characteristics, and/or other producer characteristics.

Task performance characteristics may describe a given producer's performance of user specified tasks. Examples of task performance characteristics include one or more of a task acceptance rating, a monetization success rating, a number of tasks performed, and/or other characteristics related to the task performance of a given user. The task acceptance rating may include a representation of the amount of user specified tasks a given producer of the online content performs compared to those presented. For example, a task acceptance rating of a given producer may be 51% and/or 5/10. The monetization success rating may include a representation of the success of the online content producer's prior performed user specified tasks and/or a predicted representation of the given producer's future success. The number of tasks performed may include a quantity of user specified tasks performed by a given producer.

In some implementations, a monetization success rating may be determined by a variety of factors including, for example, one or more of a producer's frequency of engaging with the portion of the user interface which displays user specified tasks (e.g., offers) presented to a given producer, an amount of engagements with specific user specified tasks presented to a given talent, user specified tasks activated and/or accepted by a given talent, performance of user specified tasks, approval of user specified tasks, outcome performance of online content resulting from user specified tasks, delta between online content resulting from user specified tasks and non-user specified task content, delta of engagement metrics between online content resulting from user specified tasks and non-user specified task content, the audience size, and/or other factors.

Connection characteristics may describe a given content producer's connections within an online social media network. For example, connection characteristics may include one or more of a quantity and/or description or a given producer's, followers, "friends", connections, subscribers, and/or other connection characteristics.

Membership characteristics may describe online communities and/or groups a given producer belongs and/or contributes to. For example, membership characteristics may include group memberships, affiliations, online partnerships, network memberships, and/or other membership characteristics. For example, a given producer may belong to a "Gamer's Connection" group on Facebook.

Demographic characteristics of content producers may include one or more of information and/or statistics related to content producers. Information and/or statistics related to content producers may include one or more of age, gender, ethnicity, race, marital status, income level, and/or other demographic information.

Location characteristics of content producers may include information regarding the location of the content producer and/or their computer/network connection. Examples of location characteristics may include a physical location, a network connection location, a user specified location, and/or other locations.

Parameter values for one or more parameters describing one or more characteristics may include one or more of a quantity, a key word, a binary value, a range, a selection from a dropdown menu, a selection from a radio button, a selection from a check box, and/or other parameter value representing the boundaries of the query for one or more parameters.

By way of non-limiting illustration, a first user defined search query may include parameter values specifying content producers of online content having a video content format, a subject matter of cooking, and/or a view count of over 1,000 content consumers. A second user defined search query may include parameter values specifying content producers of online content having a blog content format, a subject matter of cooking, and/or a view count of over 500 content consumers.

In some implementations, a first user defined search query may include parameter values specifying content producers of online content having a video content format and having produced video content as a portion of an online video channel having more than 250 subscribers. A second user defined search query may include parameter values specifying content producers having at least 1,000 connections and/or friends.

In some implementations, query component 108 may be configured to obtain and/or aggregate parameter values for individual content producers from producer account component 106, task component 114, control component 116, third party sources, and/or other locations. Producer account component 106 may include information including online content provided by producers associated with system 100.

Producer identification component 110 may be configured to identify sets of content producers having parameter values that satisfy the user defined search queries. In some implementations, responsive to receipt of a first user defined search query specifying parameter values for a first set of one or more parameters, a first set of content producers having parameter values that satisfy the first user defined search query may be identified. Responsive to receipt of a second user defined search query specifying parameter values for a second set of one or more parameters, a second set of content producers having parameter values that satisfy the second user defined search query may be identified.

By way of non-limiting illustration, a search query for a producer of and/or belonging to a video channel with a subscriber count as the parameter and at least 1000 as the parameter value would identify producers of and/or belonging to video channels having a subscriber count corresponding to the parameter value of at least 1000 subscribers.

Task component 112 may be configured to receive user specified tasks for the identified sets of producers. In some implementations, one or more of the components of task component 112 may be the same as and/or similar to one or more components of the task component described in U.S. patent application Ser. No. 14/520,264 filed on Oct. 21, 2014, entitled "Systems and Methods for Facilitating Monetizing Brand Integration within Online Content", which is incorporated herein by reference in its entirety.

In some implementations, the user specified tasks may include a first user specified task and a second user specified task. The first user specified task may be related to branded integration within a first online content. In some implementations, the first user specified task may include one or more of integrating an advertisement into a portion of online content, creating a portion of online content, and/or other user specified tasks.

For example, integrating an advertisement into a portion of online content may include posting a link in an online video description. Creating a portion of online content may include one or more of, creating video content as a portion of online video channel content, creating a video advertisement for integrating online video content, creating a video advertisement as part of a social media feed, creating a portion of pay and/or advertising content to be used pre-roll, denoting "sponsorship", and/or creating other online content.

The second user specified task may be related to promotion of the first online content. In some implementations, the second user specified task may include one or more of endorsing a portion of the first online content, promoting a portion of the first online content, and/or other user specified tasks related to the first online content.

For example, endorsing a portion of the online content may include "liking", rating, thumbs-upping, and/or otherwise endorsing a portion of online content. Promoting a portion of online content may include sharing, posting, linking, and/or otherwise promoting a portion of online content.

By way of non-limiting example, a first user specified task, for the first set of content producers that satisfied the first user defined query of producers having provided online video content having more than 5,000 views, may include providing online video content. A second user specified task, for the second set of content producers that satisfied the second user defined query of producers having provided online video content having more than 1,000 views but less than 5,000 views, may include liking the online video content provided as the first online content.

By way of non-limiting example, a first user specified task, for the first set of content producers that satisfied the first user defined query of producers having provided online video content having more than 200 subscribers and having a travel genre, may include augmenting (e.g., placing a link within) an individual one of online video content. A second user specified task, for the second set of content producers that satisfied the second user defined query of producers having more than 1,000 connections within a social media platform, may include endorsing (e.g., "liking", rating, thumbs-upping, and/or otherwise endorsing) the augmented online video content provided as the first online content.

By way of non-limiting example, a first user specified task, for the first set of content producers that satisfied the first user defined query of producers having provided online content having a first genre, may include creating online video content. A second user specified task, for the second set of content producers that satisfied the second user defined query of producers having provided online content having a second genre, may include endorsing the created online video content provided based on the first user specified task. In some implementations, a package of user specified tasks could be used to broaden and/or introduce new audiences to a given producer and/or new producers to a given audience.

In some implementations, a first user specified task for the first set of content producers that satisfied the first user defined query of producers having provided an online content quantity of 1,000, may include announcing a possible action and/or incentive to a second set of producer. A second user specified task, for the second set of content producers that satisfied the second user defined query of producers having provided an online content quantity of 500, may include performing the possible action.

Content provisioning component 114 may be configured to effectuate presentation of the user specified tasks to the sets of producers. In some implementations the first set of content producers may be presented with the first user specified task. The second set of content producers may be presented with the second user specified task. In some implementations, one or more user specified tasks may be presented to one or more sets of producers of online content identified by the user defined search queries. For example, one or more user specified tasks may be presented to the sets of content producers identified, in the form of one or more offers. A first user specified task of providing online video content may be presented to individual ones of the one or more of the first set of producers that satisfied the first user defined search query. The second user specified task of endorsing and/or promoting the provided online video content (e.g., the first online content), may be presented to individual ones of the one or more of the second set of producers that satisfied the second user defined search query.

In some implementations, content provisioning component 114 may be configured to facilitate acceptance of the user specified tasks by one or more individual ones of the identified sets of producers. Facilitating acceptance of the user specified tasks may be responsive to the presentation of the user specified tasks to one or more individual ones of the sets of producers. In some implementations, content provisioning component 114 may be configured to facilitate acceptance of the first user specified task by one or more individual ones of the first set of producers. Content provisioning component 114 may be configured to facilitate acceptance of the second user specified task by one or more individual ones of the second set of producers. For example, acceptance may include a producer's agreement to perform the presented user specified task.

In some implementations, content provisioning component 114 may be configured to facilitate display of the online content resulting from the performed user specified task. The display of the online content may include publication of the first online content. The first online content may result from the first user identified task. For example, the display or publication of the online content provided based on the performed user specified task may be via one or more virtual environments. A "virtual environment" may include a virtual space, one or more interactive, electronic social media, and/or other virtual environments. For example, electronic social media may include a social media platform. The social media platform may include, for example, one or more of Facebook, YouTube, Twitter, Pinterest, LinkedIn, Google+, Flickr, Tumblr, Blogger, and/or other social media platforms.

In some implementations, system 100 includes control component 116. Control component 116 may be configured to evaluate performance of the first user specified task by an individual one of the first set of producers to determine a first outcome corresponding to the first user specified task. The first outcome may be a quantity of a desired result and/or action corresponding to the first user specified task.

Control component 116 may be configured to evaluate performance of the second user specified task by an individual one of the second set of producers to determine a second outcome corresponding to the second user specified task. The second outcome may be a quantity of a desired result and/or action corresponding to the second user specified task.

In some implementations, the desired result and/or action may include a content consumer action based on the online content including the performed user specified task. A content consumer may include a user who views, contributes to, interacts with, and/or accesses digital media via the internet. A content consumer action may include, for example, a content consumer selecting and/or clicking on a portion of the online content, viewing a portion of the online content, promoting a portion of the online content, endorsing a portion of the online content, opening a new account based on the online content, downloading content based on the online content, other cost per action actions, and/or other content consumer actions. For example, the first outcome may include the number of times a content consumer clicks on an advertisement integrated into the identified online content. The integration of the advertisement may correspond to the first user specified task.

In some implementations, the desired result and/or action may include a producer action based on the first online content. For example, a desired result and/or action may include a producer sharing the first online content, viewing a portion of the first online content, promoting a portion of the online content, endorsing a portion of the online content, and/or other producer actions. In some implementations, the outcome may be a quantity of a desired producer actions corresponding to a user specified task. For example, the second outcome may include the number of times a producer shares the first online content. The sharing of the first online content may correspond to the second user specified task.

In some implementations, control component 116 may be configured to evaluate performance of the package of user specified tasks. The performance of the package of user specified tasks may provide a success indication of the provided social amplification of branded integration. Control component 116 may be configured to determine an outcome corresponding to the package of user specified tasks.

In some implementations, control component 116 may be configured to distribute compensation. Distribution of compensation may be based on a given outcome of a given producer's performance of a given user specified task. The compensation may include a stored value, wages, cash and/or check, awarded points, earned prizes, and/or other compensation including a representation of payment earned by the producer. In some implementations, as the outcome increases, compensation may increase. For example, a producer may earn a compensation for individual times a content consumer clicks on and/or selects an advertisement integrated into the online content by the producer. Earning compensation for individual times a content consumer clicks on and/or selects and advertisement integrated into online content may be responsive to the presentation of the user specified task to the producer. In some implementations, a producer may earn a flat compensation value for individual user specified tasks presented to and performed by the producer.

In some implementations, control component 116 may be configured to facilitate approval of the first user specified task. Control component 116 may be configured to facilitate approval of the first user specified task responsive to the performance of the first user specified task by one or more individual ones of the first set of producers. Approval may include confirmation that the first user specified task performed by an individual one of the one or more of the first set of producers represents the first user specified task presented to the first set of producers. For example, approval may include a user indicating the performed user specified task was performed according to specifications set forth by the user in the user specified task presented. The specifications set forth by the user may include criteria and/or requirements the user expects the performed user specified task to meet. In some implementations, approval may be required prior to display or publication of the online content including the performed user specified task.

Referring again to producer account component 106, producer profiles and/or producer information managed and/or accessed by producer account component 106 may include outcome information, compensation information, monetization information, and/or other information related to facilitating monetizing brand integration within online content. In some implementations, producer account component 106 may effectuate presentation of a producer interface (see, e.g., FIG. 3). The producer interface may facilitate display of a portion of the producer profile and/or producer information. In some implementations, content provisioning component 114 may effectuate presentation of the user specified tasks to producers via the producer interface. In some implementations, content provisioning component 114 may facilitate acceptance of one or more of the user specified tasks by one or more producers via the producer interface.

Figure 2:
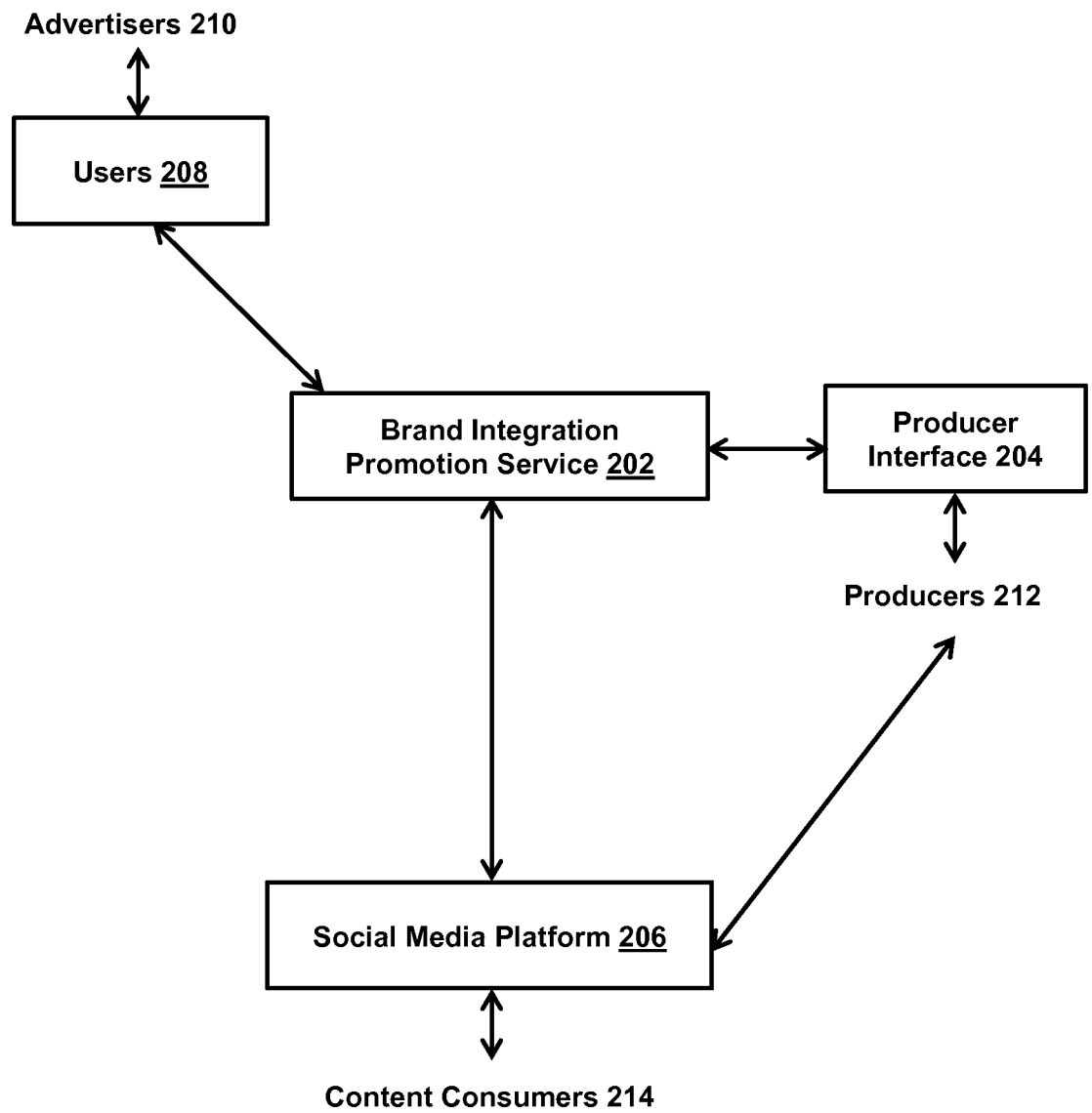
FIG. 2 illustrates an exemplary architecture for the system of FIG. 1, in accordance with one or more implementations.

FIG. 2 illustrates an exemplary architecture for system 100, in accordance with one or more implement. A brand integration promotion service 202 may operate server(s) 102 (see FIG. 1). Brand integration promotion service 202 may communicate with multiple parties including one or more of a user 208, an advertiser 210, a producer 212, a social media platform 206, content consumers 214, and/or other parties. Brand integration promotion service 202 may communicate with producers 212 via producer interface 204. Users 208 may provide user defined search queries to brand integration promotion service 202. Users 208 may provide user specified tasks to brand integration promotion service 202. Brand integration promotion service 202 may identify online content and/or content producers (see, e.g., producer identification component 110 described in connection with FIG. 1). Brand integration promotion service 202 may associate identified online content with given producers.

Brand integration promotion service 202 may communicate user specified tasks to identified producers 212 (see, e.g., content provisioning component 114 described in connection with FIG. 1). Producer interface 204 may facilitate display of the user specified tasks to producers 212. Producers 212 may accept user specified tasks. Producers 212 may perform user specified tasks. Brand integration promotion service 202 may facilitate display and/or publication of online content resulting from the user specified task performed by one or more of producers 212 via social media platform 206. Performance of one or more user specified tasks relating to promoting the online content resulting from a given user specified task may be performed via social media platform 206. Content consumers 214 may access, view, interact with, and/or otherwise consumer online content resulting from a given user specified task via social media platform 206.

Brand integration promotion service 202 may evaluate performance of the first user specified task (see, e.g., control component 116 described in connection with FIG. 1). Brand integration promotion service 202 may determine an outcome corresponding to the online content resulting from the first user specified task (see, e.g., control component 116 described in connection with FIG. 1). In some implementations, brand integration promotion service 202 may evaluate performance and/or determine an outcome via a third party provider. Users 208 may compensate producers 212 via brand integration promotion service 202.

Figure 3:
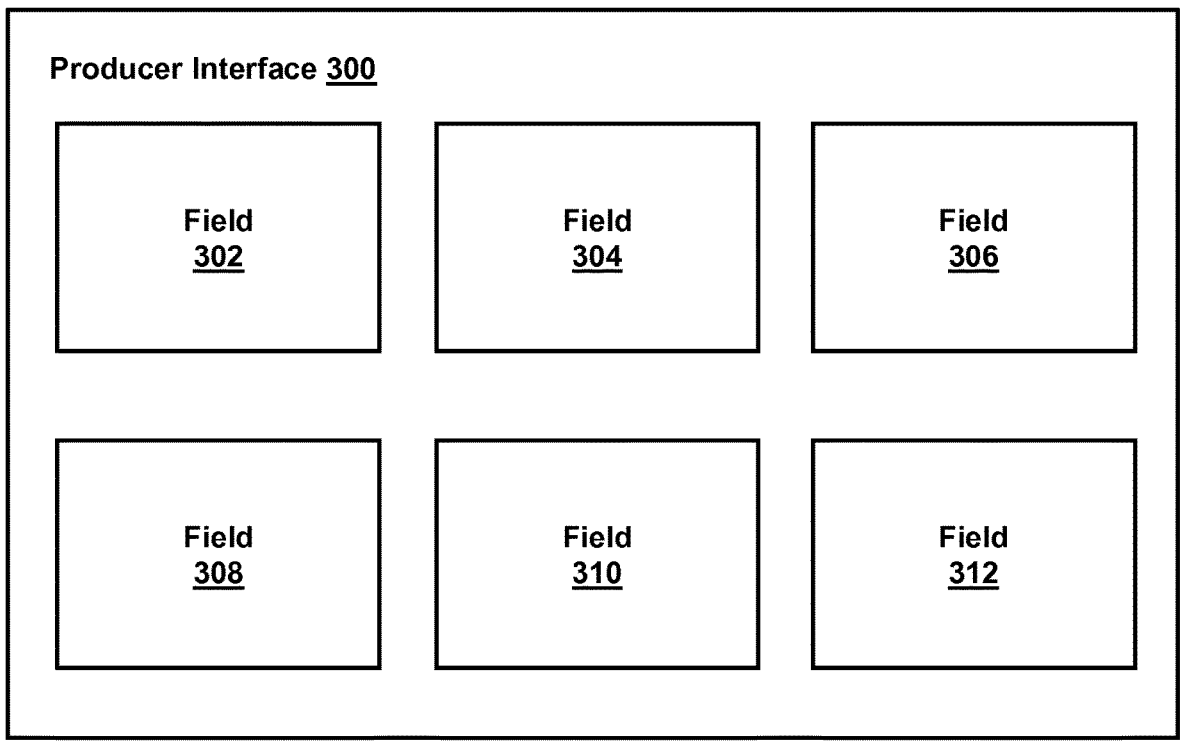
FIG. 3 illustrates a view of a producer interface, in accordance with one or more implementations.

FIG. 3 illustrates a view of a producer interface 300, in accordance with one or more implementations. Producer interface 300 may include one or more of fields 302, 304, 306, 308, 310, 312 and/or other fields. In some implementations, one or more of the components of producer interface 300 may be the same as and/or similar to one or more components in the producer interface described in U.S. patent application Ser. No. 14/520,275 filed on Oct. 21, 2014, entitled, "Systems And Methods For Providing a Graphical User Interface For Providing Brand Integration Within Online Content, Managing Brand Integration Within Online Content, And/Or Managing Compensation Associated With Online Content", which is incorporated herein by reference in its entirety. In some implementations, field 302 may be configured to facilitate display of one or more user specified tasks presented to a producer corresponding to producer interface 300 based on information from task component 112.

In some implementations, field 304 may be configured to facilitate display of the compensation determined by control component 116 and based on an outcome corresponding to one or more user specified tasks performed by the producer corresponding to producer interface 300. Field 306 may facilitate display of information related to managing and/or tracking monetizing brand integration and/or promotion based on information from producer account component 106 and/or control component 116. Field 308 may facilitate display of compensation history and/or information from producer account component 106 and/or control component 116. Field 310 may facilitate display of user specified task history from information from task component 112 and/or control component 116. Field 312 may facilitate display of producer profiles and/or information from producer account component 106.

It should be appreciated that although fields 302, 304, 306, 308, 310, and 312 are illustrated in FIG. 3 as being co-located within a single view of producer interface 300, that is not intended to be limiting. Rather, one or more of fields 302, 304, 306, 308, 310, and 312 may be included in separate views of producer interface 300. The description of the functionality provided by the different fields 302, 304, 306, 308, 310, and 312 described herein is for illustrative purposes, and is not intended to be limiting, as any of fields 302, 304, 306, 308, 310, and 312 may provide more or less functionality than is described. For example, one or more of fields 302, 304, 306, 308, 310, and 312 may be eliminated, and some or all of its functionality may be provided by other ones of fields 302, 304, 306, 308, 310, and 312. As another example, producer interface 300 may be configured to provide one or more additional fields that may perform some or all of the functionality attributed herein to one of fields 302, 304, 306, 308, 310, and 312.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute components 106, 108, 110, 112, 114, 116, and/or other components. The processor(s) 124 may be configured to execute components 106, 108, 110, 112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, 114, and 116 are illustrated in FIG. 1 as being co-located within a single processing unit, in implementations in which processor(s) 124 includes multiple processing units, one or more of components 106, 108, 110, 112, 114, and/or 116 may be located remotely from the other components. The description of the functionality provided by the different components 106, 108, 110, 112, 114, and/or 116 described herein is for illustrative purposes, and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, and/or 116. As another example, processor(s) 124 may be configured to execute one or more additional components that may perform some or all of the functionality attributed herein to one of components 106, 108, 110, 112, 114, and/or 116.

Figure 4:
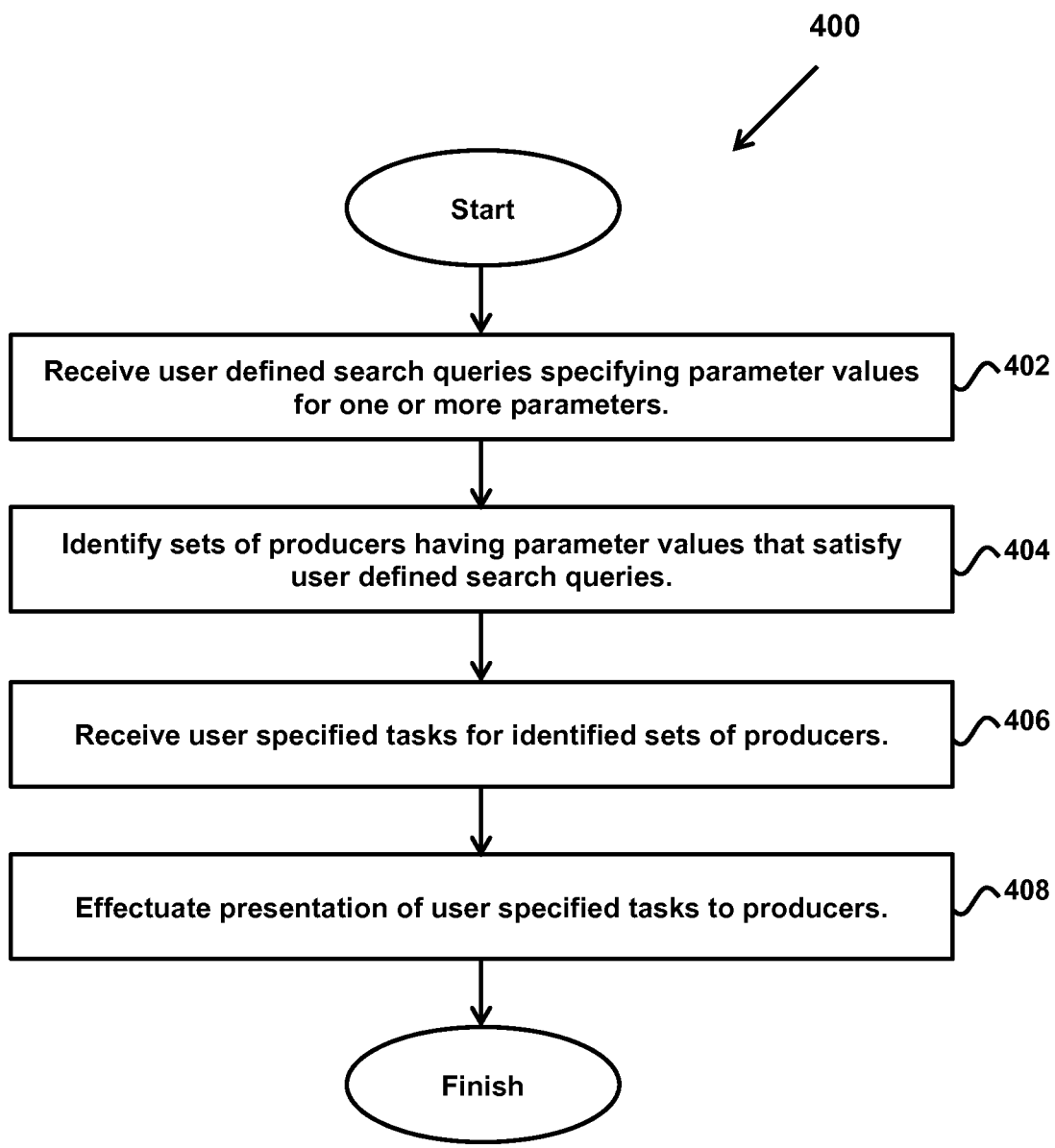
FIG. 4 illustrates a method for facilitating brand integration within online content and promoting that online content, in accordance with one or more implementations.

FIG. 4 illustrates a method 400 for facilitating brand integration within online content and promoting that online content, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, user defined search queries specifying parameter values for one or more parameters may be received. In some implementations the user defined search queries may include a first user defined search query and a second user defined search query. Operation 402 may be performed by a query component that is the same as or similar to query component 108, in accordance with one or more implementations.

At an operation 404, sets of content producers having parameter values that satisfy the user defined search queries may be identified. A first set of content producers having parameter values that satisfy the first user defined search query may be identified. In some implementations, identification of the first set of content producers may be responsive to receipt of a first user defined search query specifying parameter values for a first set of one or more parameters. A second set of content producers having parameter values that satisfy the second user defined search query may be identified. In some implementations, identification of the second set of content producers may be responsive to receipt of a second user defined search query specifying parameter values for a second set of one or more parameters. Operation 404 may be performed by a producer identification component that is the same as or similar to producer identification component 110, in accordance with one or more implementations.

At an operation 406, user specified tasks for identified online content may be received. A first user specified task may be related to brand integration within a first online content. A second user specified task may be related to promoting the first online content. In some implementations, the user specified tasks may include a first user specified tasks for a first set of content producers identified as satisfying the first user defined search query. In some implementations, the user specified tasks may include a second user specified task for a second set of content producers identified as satisfying the second user defined search query. Operation 406 may be performed by a task component that is the same as or similar to task component 112, in accordance with one or more implementations.

At an operation 408, presentation of the user specified tasks to producers may be effectuated. In some implementations, a first set of content producers may be presented with the first user specified task. The second set of content producers may be presented with the second user specified task. Operation 408 may be performed by a content provisioning component that is the same as or similar to content provisioning component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured for facilitating brand integration within online content and promoting that online content, the system comprising:
one or more physical computer processors configured by computer readable instructions to:
receive, over a network from one or more client computing platforms associated with one or more users, user defined search queries specifying parameter values for one or more parameters, the queries including a first user defined search query and a second user defined search query, the one or more parameters describing characteristics of content producers;
identify sets of content producers having parameter values that satisfy the user defined search queries, the sets of content producers including:
a first set of content producers, such that responsive to receipt of a first user defined search query specifying parameter values for a first set of one or more parameters, a first set of content producers having parameter values that satisfy the first user defined search query is identified, and
a second set of content producers, such that responsive to receipt of a second user defined search query specifying parameter values for a second set of one or more parameters, a second set of content producers having parameter values that satisfy the second user defined search query is identified;
receive, over the network from the one or more client computing platforms associated with the one or more users, user specified tasks for the sets of content producers identified, the user specified tasks including both a first user specified task including creating a first online content and a second user specified task including promoting the first online content;
effectuate presentation, via a producer interface, of the user specified tasks to producers, such that the first set of content producers is presented with the first user specified task and the second set of content producers is presented with the second user specified task; and facilitate acceptance, via the producer interface, of the first user specified task, including creating the first online content, by one or more individual ones of the first set of content producers, and facilitate acceptance of the second user specified task, including promoting the first online content via the Internet, by one or more individual ones of the second set of content producers.

2. The system of claim 1, wherein the one or more physical computer processors are further configured by computer readable instructions to:
evaluate performance of the first user specified task to determine a first outcome corresponding to the first user specified task performed by an individual one of the first set of content producers; and
distribute compensation based on the first outcome, the compensation including a stored value including a representation of payment earned by the individual one of the first set of producers.

3. The system of claim 1, wherein the one or more physical computer processors are further configured by computer readable instructions to:
evaluate performance of the second user specified task to determine a second outcome corresponding to the second user specified task performed by an individual one of the second set of content producers; and
distribute compensation based on the second outcome, the compensation including a stored value including a representation of payment earned by the individual one of the second set of producers.

4. The system of claim 1, wherein the one or more physical computer processors are further configured by computer readable instructions to facilitate approval of the first user specified task, approval being confirmation that the first user specified task performed by an individual one of the first set of producers represents the first user specified task presented.

5. The system of claim 1, wherein the one or more physical computer processors are further configured by computer readable instructions to, facilitate display of the first online content, the display being a publication of the first online content.

6. The system of claim 1, wherein the first online content includes one or more of and/or a portion of an online video content, a social media content, and/or an online content channel or feed.

7. The system of claim 6, wherein the first user specified task further includes integrating an advertisement into the first online content.

8. The system of claim 1, where in the second user specified task further includes promoting and/or endorsing the online content via a social media platform.

9. The system of claim 1, wherein the parameters describe one or more of a producer content characteristic and/or a producer characteristic.

10. A method configured for facilitating brand integration within online content and promoting that online content, the method being performed by one or more processors configured by computer readable instructions, the method comprising:
receiving, over a network at the one or more processors from one or more client computing platforms associated with one or more users, user defined search queries specifying parameter values for one or more parameters, the queries including a first user defined search query and a second user defined search query, the one or more parameters describing characteristics of content producers;
identifying, at the one or more processors, sets of producers having parameter values that satisfy the user defined search queries, the sets of content producers including:
a first set of content producers, such that responsive to receipt of a first user defined search query specifying parameter values for a first set of one or more parameters, a first set of content producers having parameter values that satisfy the first user defined search query is identified, and
a second set of content producers, such that responsive to receipt of a second user defined search query specifying parameter values for a second set of one or more parameters, a second set of content producers having parameter values that satisfy the second user defined search query is identified;
receiving, over the network at the one or more processors from the one or more client computing platforms associated with the one or more users, user specified tasks for the sets of content producers identified, the user specified tasks including both a first user specified task including creating a first online content and a second user specified task including promoting the first online content;
effectuating, by the one or more processors via a producer interface, presentation of the user specified tasks to producers, such that the first set of content producers is presented with the first user specified task and the second set of content producers is presented with the second user specified task; and
facilitating, by the one or more processors via the producer interface, acceptance of the first user specified task, including creating the first online content, by one or more individual ones of the first set of content producers, and facilitate acceptance of the second user specified task, including promoting the first online content via the Internet, by one or more individual ones of the second set of content producers.

11. The method of claim 10, further comprising:
evaluating, at one or more processors, performance of the first user specified task to determine a first outcome corresponding to the first user specified task performed by an individual one of the first set of content producers; and distributing, at one or more processors, compensation based on the first outcome, the compensation including a stored value including a representation of payment earned by the individual one of the first set of producers.

12. The method of claim 10, further comprising:
evaluating, at one or more processors, performance of the second user specified task to determine a second outcome corresponding to the second user specified task performed by an individual one of the second set of content producers; and
distributing, at one or more processors, compensation based on the second outcome, the compensation including a stored value including a representation of payment earned by the individual one of the second set of producers.

13. The method of claim 10, further comprising facilitating, at one or more processors, approval of the first user specified task, approval being confirmation that the first user specified task performed by an individual one of the first set of producers represents the first user specified task presented.

14. The method of claim 10, further comprising facilitating, at one or more processors, display of the first online content, the display being a publication of the first online content.

15. The method of claim 10, wherein the first online content includes one or more of and/or a portion of an online video content, a social media content, and/or an online content channel or feed.

16. The method of claim 10, wherein the first user specified task further includes integrating an advertisement into the first online content.

17. The method of claim 10, wherein the second user specified task further includes promoting and/or endorsing the online content via a social media platform.

18. The method of claim 10, wherein the parameters describe one or more of a producer content characteristic and/or a producer characteristic.

* * * * *